United States Patent
Lei

(10) Patent No.: US 9,411,646 B2
(45) Date of Patent: Aug. 9, 2016

(54) BOOTING SECONDARY PROCESSORS IN MULTICORE SYSTEM USING KERNEL IMAGES STORED IN PRIVATE MEMORY SEGMENTS

(71) Applicant: Huawei Technologies Co., Ltd., Shenzhen, Guangdong (CN)

(72) Inventor: Xiaosong Lei, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/573,428

(22) Filed: Dec. 17, 2014

(65) Prior Publication Data
US 2015/0106822 A1 Apr. 16, 2015

Related U.S. Application Data

(63) Continuation of application No. PCT/CN2013/076329, filed on May 28, 2013.

(51) Int. Cl.
*G06F 9/50* (2006.01)
*G06F 9/52* (2006.01)
*G06F 9/44* (2006.01)

(52) U.S. Cl.
CPC ............ *G06F 9/5005* (2013.01); *G06F 9/4405* (2013.01); *G06F 9/4406* (2013.01); *G06F 9/52* (2013.01)

(58) Field of Classification Search
None
See application file for complete search history.

(56) References Cited

U.S. PATENT DOCUMENTS

| 5,590,301 A * | 12/1996 | Guenthner | G06F 12/0284 711/202 |
| 7,363,484 B2 * | 4/2008 | Davis | G06F 9/4405 713/1 |
| 7,386,711 B1 * | 6/2008 | Haimovsky | G06F 9/4416 709/221 |

(Continued)

FOREIGN PATENT DOCUMENTS

| CN | 101149728 A | 3/2008 |
| CN | 101256512 A | 9/2008 |

(Continued)

OTHER PUBLICATIONS

Boyd-Wickizer et al., "Corey: An Operating System for Many Cores," 8th USENIX Symposium on Operating Systems Design and Implementation, pp. 43-57, USENIX Association, Berkeley, California (Dec. 2008).

*Primary Examiner* — Benjamin Wu
(74) *Attorney, Agent, or Firm* — Leydig, Voit & Mayer, Ltd.

(57) ABSTRACT

Embodiments of the present invention provide a method and a system for supporting resource isolation in a multi-core architecture. In the method and system for supporting resource isolation in a multi-core architecture provided by the embodiments of the present invention, manners of inter-core operating system isolation, memory segment isolation, and I/O resource isolation are adopted, so that operating systems that run on different processing cores of the multi-core processor can run independently without affecting each other. Therefore, the present invention fully uses the advantages high integration level and low comprehensive costs of the multi-core processor, it is achieved that a failure domain of the multi-core processor remains in a single hard disk, and the multi-core processor has high reliability.

17 Claims, 5 Drawing Sheets

(56) References Cited

U.S. PATENT DOCUMENTS

| | | | |
|---|---|---|---|
| 7,836,293 B1* | 11/2010 | Wynia | G06F 9/4405 709/201 |
| 7,908,470 B1* | 3/2011 | Cavanna | G06F 9/4401 711/1 |
| 2002/0133678 A1* | 9/2002 | Mathews | G06F 12/0284 2/284 |
| 2003/0131225 A1* | 7/2003 | Bradley | G06F 15/177 713/2 |
| 2005/0091473 A1* | 4/2005 | Aguilar | G06F 9/5027 712/28 |
| 2008/0046705 A1* | 2/2008 | Hirai | G06F 9/4405 713/1 |
| 2008/0109624 A1* | 5/2008 | Gilbert | G06F 12/0284 711/163 |
| 2009/0006801 A1 | 1/2009 | Shultz et al. | |
| 2009/0094450 A1* | 4/2009 | Krzyzanowski | G06F 8/65 713/100 |
| 2011/0035575 A1* | 2/2011 | Kwon | G06F 9/4405 713/2 |
| 2012/0072710 A1* | 3/2012 | Gupta | G06F 9/4405 713/2 |
| 2012/0089814 A1* | 4/2012 | Gupta | G06F 9/445 712/30 |
| 2012/0210115 A1* | 8/2012 | Park | H04L 9/3242 713/2 |
| 2013/0151829 A1* | 6/2013 | Amann | G06F 9/4401 713/2 |
| 2014/0317392 A1* | 10/2014 | Kawano | G06F 9/4406 713/2 |
| 2016/0041850 A1* | 2/2016 | Hirata | G06F 9/46 718/107 |

FOREIGN PATENT DOCUMENTS

| | | |
|---|---|---|
| CN | 101681268 A | 3/2010 |
| CN | 102541805 A | 7/2012 |
| CN | 103020002 A | 4/2013 |
| CN | 103092788 A | 5/2013 |
| EP | 0320274 A2 | 6/1989 |
| WO | WO 0116760 A1 | 3/2001 |

* cited by examiner

BOOTING SECONDARY PROCESSORS IN MULTICORE SYSTEM USING KERNEL IMAGES STORED IN PRIVATE MEMORY SEGMENTS

CROSS-REFERENCE TO RELATED APPLICATIONS

This application is a continuation of International Patent Application No. PCT/CN2013/076329, filed on May 28, 2013, which is hereby incorporated by reference in its entirety.

TECHNICAL FIELD

Embodiments of the present invention relate to computer technologies, and in particular, to a method and a system for supporting resource isolation in a multi-core architecture.

BACKGROUND

A cloud storage system based on a large-scale unified resource pool focuses on data storage and management, supports unified deployment of multiple services, efficiently use disks, reduces investment loss by means of on-demand supply, and effectively uses resources and reduces comprehensive energy consumption by means of reasonable scheduling.

In the prior art, a server that has a multi-core ARM processor and a few hard disks is adopted. For example, an ARM server based on a reduced instruction set computing (RISC for short) may give play to advantages of the ARM processor: low power consumption, high integration level, and low comprehensive costs.

However, in the case of the multi-core ARM processor with multiple hard disks in the prior art, an operating system runs on the multi-core processor, and when the operating system fails, failure granularity of the server is multiple hard disks. Furthermore, since a capacity of a single hard disk is large and input/output (I/O for short) throughput bandwidth is small, both data restoration amount and network transmission data amount grow exponentially, and failure recovery granularity is coarse, bringing large pressure to the system.

SUMMARY

Embodiments of the present invention provide a method and a system for supporting resource isolation in a multi-core architecture, to enable a failure domain of a multi-core processor to remain in a single hard disk.

According to a first aspect, an embodiment of the present invention provides a system for supporting resource isolation in a multi-core architecture, where the system includes: a processor, where the processor includes multiple processing cores, and the multiple processing cores include a start-time primary core and at least one start-time secondary core; and memory space, where the memory space includes a shared memory segment and memory segments of the processing cores. Running information and run-time entry addresses of the processing cores are stored in the shared memory segment. The running information includes a mapping relationship between each processing core and each operating system, and sizes and start addresses of the memory segments. The run-time entry addresses of the processing cores are used to indicate, in respective memory segments, storage addresses of kernel images of operating systems that the processing cores need to run. The processor separately stores the kernel images of the operating systems that the processing cores need to run into the memory segments of the processing cores, and separately writes the run-time entry addresses of the processing cores into the shared memory segment. Processing cores to be started separately obtain respective run-time entry addresses, and run the kernel images of the operating systems stored in respective memory segments.

In a first possible implementation manner of the first aspect, the processing cores of the processor elect and determine a run-time primary core from the processing cores according to a preset election algorithm, where the run-time primary core is used to perform arbitration control over input/output I/O resources.

With reference to the first possible implementation manner of the first aspect, in a second possible implementation manner, a run-time secondary core puts data that requires an I/O operation in the shared memory segment, and notifies the run-time primary core of a memory address related to the I/O operation, so that the run-time primary core invokes its own local physical drive to perform the I/O operation on an external device.

With reference to the first possible implementation manner of the first aspect, in a third possible implementation manner, the run-time secondary core invokes its own local physical drive, to perform an I/O operation on an external device.

With reference to the first aspect and any one of the first to the third possible implementation manners of the first aspect, in a fourth possible implementation manner, a boot loader is disposed inside the start-time primary core; and that the processor separately stores the kernel images of the operating systems that the processing cores need to run into the memory segments of the processing cores includes: the boot loader separately stores, according to the running information, the kernel images of the operating systems that the processing cores need to run into the memory segments of the processing cores.

With reference to the first aspect and any one of the first to the third possible implementation manners of the first aspect, in a fifth possible implementation manner, a boot loader is disposed inside the start-time primary core; and that the processor separately stores the kernel images of the operating systems that the processing cores need to run into the memory segments of the processing cores includes: the boot loader stores, according to the running information, the kernel image of the operating system that needs to be run into the memory segment allocated to at least one processing core of the processor, and runs the kernel image of the operating system; and the processing core that runs the operating system separately stores, according to the running information, kernel images of operating systems corresponding to the other processing cores of the processor that need to run the operating systems into memory segments of the other processing cores.

With reference to the first aspect and any one of the first to the fifth possible implementation manners of the first aspect, in a sixth possible implementation manner, a processing core group that includes at least two processing cores runs a kernel image of a same operating system, and furthermore, all the processing cores that constitute the processing core group share a same memory segment; or, the processing cores run kernel images of mutually different operating systems.

According to a second aspect, an embodiment of the present invention provides a method for supporting resource isolation in a multi-core architecture, applicable to a system for supporting resource isolation in a multi-core architecture, where the system includes a processor and memory space. The processor includes multiple processing cores, and the multiple processing cores include a start-time primary core and at least one start-time secondary core. The memory space includes a shared memory segment and memory segments of the processing cores. Running information and run-time entry addresses of the processing cores are stored in the shared memory segment. The running information includes a mapping relationship between each processing core and each operating system, and sizes and start addresses of the memory segments. The run-time entry addresses of the processing cores are used to indicate, in respective memory segments, storage addresses of kernel images of operating systems that the processing cores need to run.

The method for supporting resource isolation in a multi-core architecture includes:

separately storing, by the processor, the kernel images of the operating systems that the processing cores need to run into the memory segments of the processing cores, and separately writing the run-time entry addresses of the processing cores into the shared memory segment; and separately obtaining, by processing cores to be started, respective run-time entry addresses, and running the kernel images of the operating systems stored in respective memory segments.

In a first possible implementation manner of the second aspect, the processing cores of the processor elect and determine a run-time primary core from the processing cores according to a preset election algorithm, where the run-time primary core is used to perform arbitration control over input/output resources.

With reference to the first possible implementation manner of the second aspect, in a second possible implementation manner, a run-time secondary core puts data that requires an I/O operation in the shared memory segment, and notifies the run-time primary core of a memory address related to the I/O operation, so that the run-time primary core invokes its own local physical drive to perform the I/O operation on an external device.

With reference to the first possible implementation manner of the second aspect, in a third possible implementation manner, the run-time secondary core invokes its own local physical drive to perform the I/O operation on an external device.

With reference to the second aspect and any one of the first to the third possible implementation manners of the second aspect, in a fourth possible implementation manner, a boot loader is disposed inside the start-time primary core; and separately storing, by the processor, the kernel images of the operating systems that the processing cores need to run into the memory segments of the processing cores includes:

separately storing, by the boot loader, according to the running information, the kernel images of the operating systems that the processing cores need to run into the memory segments of the processing cores.

With reference to the second aspect and any one of the first to the third possible implementation manners of the second aspect, in a fifth possible implementation manner, a boot loader is disposed inside the start-time primary core; and separately storing, by the processor, the kernel images of the operating systems that the processing cores need to run into the memory segments of the processing cores includes:

storing, by the boot loader, according to the running information, the kernel image of the operating system that needs to be run into the memory segment allocated to at least one processing core of the processor, and running the kernel image of the operating system; and separately storing, by the processing core that runs the operating system, according to the running information, kernel images of operating systems corresponding to the other processing cores of the processor that need to run the operating systems into memory segments of the other processing cores.

With reference to the second aspect and any one of the first to the fifth possible implementation manners of the second aspect, in a sixth possible implementation manner, a processing core group that includes at least two processing cores runs a kernel image of a same operating system, and furthermore, all the processing cores that constitute the processing core group share a same memory segment; or, the processing cores run kernel images of mutually different operating systems.

In the method and system for supporting resource isolation in a multi-core architecture provided by the embodiments of the present invention, manners of inter-core operating system isolation, memory segment isolation, and I/O resource isolation are adopted, so that the operating systems that run on different processing cores of the multi-core processor can run independently without affecting each other. Therefore, the advantages high integration level and low comprehensive costs of the multi-core processor are fully used, it is achieved that a failure domain of the multi-core processor remains in a single hard disk, and the multi-core processor has high reliability.

BRIEF DESCRIPTION OF DRAWING(S)

FIG. 2 is a partial schematic structural diagram of a shared memory segment in the system for supporting resource isolation in a multi-core architecture shown in FIG. 1a;

Figure 4A:
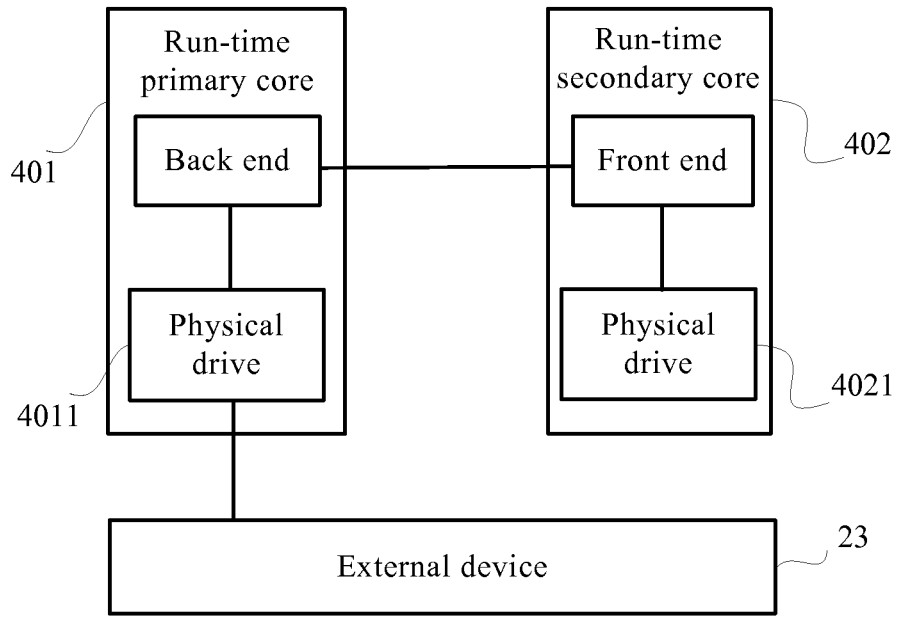
FIG. 4a is a schematic diagram of implementation that a run-time secondary core of the system for supporting resource isolation in a multi-core architecture according to the second embodiment of the present invention accesses an external device.
Figure 4B:
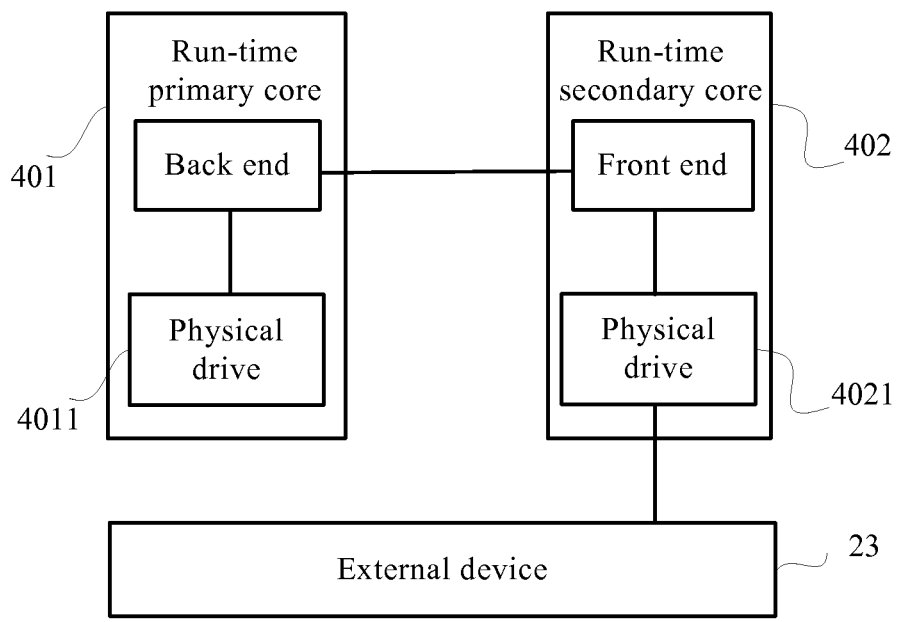
Figure 5:
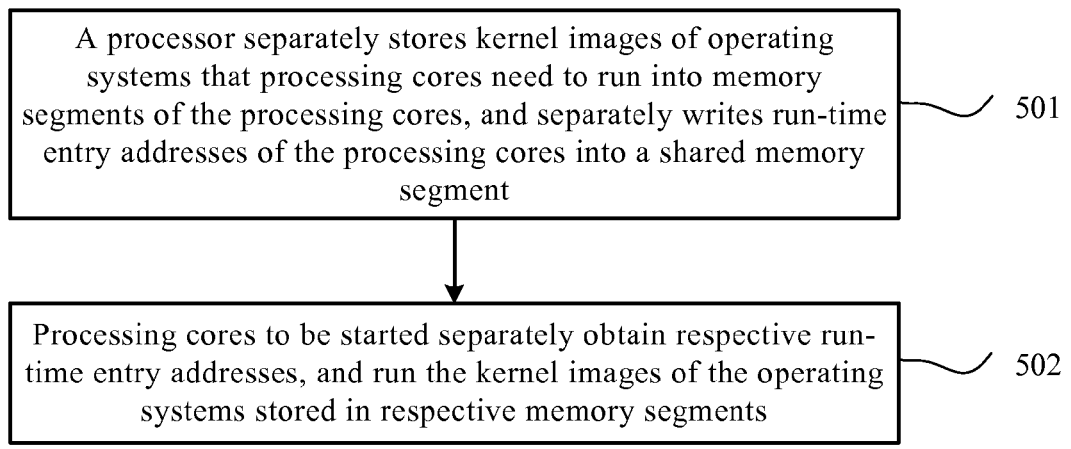

FIG. 4b is a schematic diagram of another implementation that a run-time secondary core of the system for supporting resource isolation in a multi-core architecture according to the second embodiment of the present invention accesses an external device; and FIG. 5 is a flowchart of a method for supporting resource isolation in a multi-core architecture according to a third embodiment of the present invention.

DESCRIPTION OF EMBODIMENTS

First Embodiment

Figure 1A:
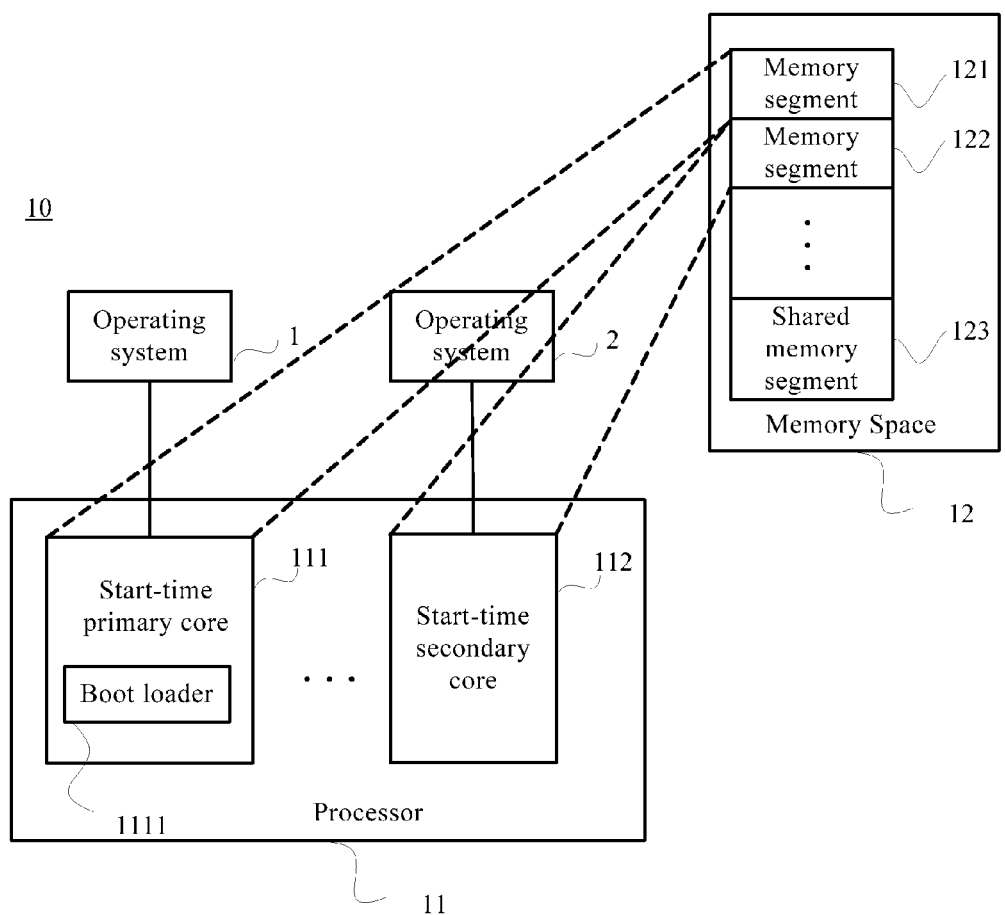
FIG. 1a is a schematic structural diagram of a system for supporting resource isolation in a multi-core architecture according to a first embodiment of the present invention.
Figure 1B:
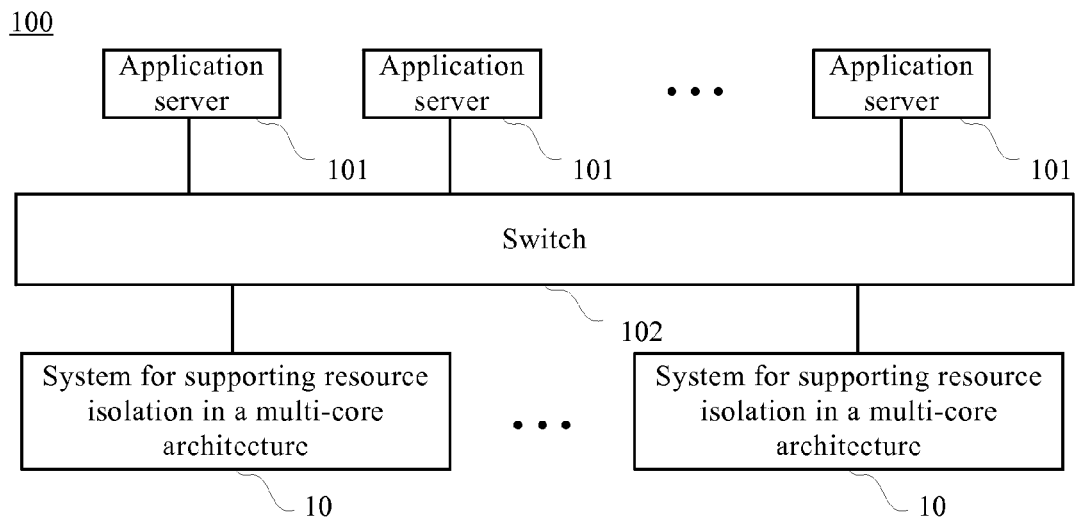
FIG. 1b is a schematic structural diagram of a topology of a cloud storage system that adopts the system for supporting resource isolation in a multi-core architecture in the first embodiment of the present invention.

FIG. 1a is a schematic structural diagram of a system for supporting resource isolation in a multi-core architecture according to a first embodiment of the present invention. A system 10 for supporting resource isolation in a multi-core architecture shown in FIG. 1a is applicable to a cloud storage system based on a large-scale unified resource pool. FIG. 1b is a schematic structural diagram of a topology of a cloud storage system that adopts the system for supporting resource isolation in a multi-core architecture in the first embodiment of the present invention. As shown in FIG. 1b, a cloud storage system 100 includes: a switch 102, at least one system 10 for supporting resource isolation in a multi-core architecture, and at least one application server 101. The application server 101 is connected to the switch 102, and the system 10 for supporting resource isolation in a multi-core architecture is connected to the switch 102.

As shown in FIG. 1a, the system 10 for supporting resource isolation in a multi-core architecture in this embodiment includes: a processor 11 and memory space 12.

The processor 11 includes multiple processing cores: a start-time primary core 111 and at least one start-time secondary core 112.

The memory space 12 includes a shared memory segment 123, a memory segment 121 of the start-time primary core 111 and a memory segment 122 of the start-time secondary core 112. Running information and run-time entry addresses of the processing cores are stored in the shared memory segment 123. The running information includes a mapping relationship between each processing core and each operating system, and sizes and start addresses of the memory segments. The run-time entry addresses of the processing cores are used to indicate, in respective memory segments, storage addresses of kernel images of operating systems that the processing cores need to run.

The processor 11 separately stores the kernel images of the operating systems that the processing cores need to run into the memory segments of the processing cores, and writes the run-time entry addresses of the processing cores into the shared memory segment 123. Processing cores to be started separately obtain respective run-time entry addresses, and run the kernel images of the operating systems stored in respective memory segments.

Specifically, as shown in FIG. 1a, the processor 11 is a multi-core processor including multiple processing cores. For example, an ARM or Intel ATOM processor may be adopted, but the present invention is not limited thereto. The processor 11 includes multiple processing cores, and FIG. 1a shows an example of a situation in which the processor 11 includes a start-time primary core 111 and a start-time secondary core 112. However, the processor 11 may include one or more start-time secondary cores, and details are not described herein again. The start-time primary core 111 refers to a processing core pre-determined by hardware and is configured with a boot loader 1111. Furthermore, the start-time primary core 111 is capable of triggering other processing cores to start and run. The start-time secondary core 112 refers to another processing core that is triggered and started by the start-time primary core 111 when the processor 11 is started. In a specific application, the boot loader 1111, for example, a UBoot, disposed inside the start-time primary core may implement device initialization, and may also store a kernel image of an operating system into a memory segment of a processing core that needs to run the operating system. FIG. 1a shows a mapping relationship between the start-time primary core 111 and an operating system 1, and between the start-time secondary core 112 and an operating system 2 respectively, where the operating system 1 and the operating system 2 may be LINUX, Windows, Solaris, DOS, OS/2, UNIX, XENIX, Netware, or different versions of a same operating system. In addition, the operating system 1 and the operating system 2 may be identical operating systems, and may also be different versions of a same type of operating system, or be operating systems of different types, but the present invention is not limited thereto.

Figure 2:
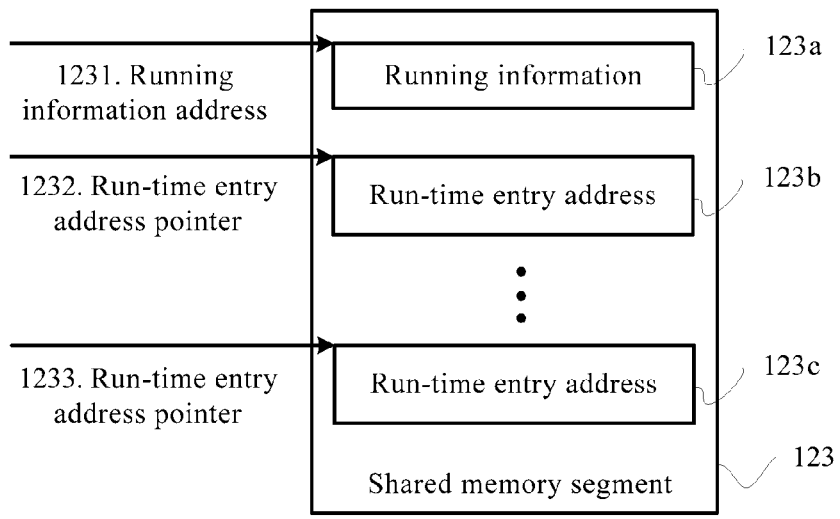

FIG. 2 is a partial schematic structural diagram of a shared memory segment in the system for supporting resource isolation in a multi-core architecture shown in FIG. 1a. As shown in FIG. 1a and FIG. 2, running information 123a, a run-time entry address 123b of the start-time secondary core 112, and a run-time entry address 123c of the start-time primary core 111 are stored in the shared memory segment 123. The running information 123a records planning information of a memory segment, and at least includes: a mapping relationship between each processing core and each operating system, and sizes and start addresses of the memory segments, that is, the following information: (1) the start-time primary core 111 running the operating system 1, and a size and a start address of the memory segment 121 allocated to the start-time primary core 111; (2) the start-time secondary core 112 running the operating system 2, and a size and a start address of the memory segment 122 allocated to the start-time secondary core 112; and (3) a size and a start address of the shared memory segment 123. The memory segments are independent of each other and isolated from each other, thereby allocating memory segments that are independent of each other to different operating systems. If the start address of each memory segment is not designated, by default the start address starts from an address 0, or starts from an end address of the previous memory segment. A running information address 1231 is a storage address of the running information 123a in the shared memory segment 123. The processing cores need to comply with an agreement of the running information address 1231, and query the running information by using the running information address 1231. Optionally, running information addresses of the processing cores are separately indicated in the kernel image of the operating system stored by each processing core, and the running information may be dynamically modified and adjusted in the system running process. A run-time entry address pointer 1232 of the start-time secondary core 112 points to the run-time entry address 123b of the start-time secondary core 112, where the run-time entry address 123b is used to indicate, in the memory segment 122, a storage address of a kernel image of the operating system 2 that the start-time secondary core 112 needs to run. A run-time entry address pointer 1233 of the start-time primary core 111 points to the run-time entry address 123c of the start-time primary core 111, where the run-time entry address 123c is used to indicate, in the memory segment 121, a storage address of a kernel image of the operating system 1 that the start-time primary core 111 requires to run. Run-time entry address pointers of each processing core are separately preset in the UBoot before the system is started.

In the system for supporting resource isolation in a multi-core architecture provided by the embodiment of the present invention, manners of inter-core operating system isolation and memory segment isolation are adopted, so that the operating systems that are run on different processing cores of the multi-core processor can run independently without affecting each other. When a single processing core or an operating system run thereon fails, other processing cores or operating systems run on the other processing cores will not be affected. Therefore, the advantages of high integration level and low comprehensive costs of the multi-core processor are fully used, it is achieved that a failure domain of the multi-core processor remains in a single hard disk, and the multi-core processor has high reliability.

On the basis of the foregoing embodiment, the processor 11 stores the kernel images of the operating systems that the processing cores need to run into the memory segments of the processing cores in at least the following two manners:

Manner 1: the boot loader 1111 separately stores, according to the running information 123a, the kernel images of the operating systems that the processing cores need to run into the memory segments of the processing cores.

Manner 2: the boot loader 1111 stores, according to the running information 123a, the kernel image of the operating system that at least one processing core of the processor needs to run into the memory segment of the processing core, and the processing core runs the kernel image of the operating system; and the processing core that runs the operating system separately stores, according to the running information, kernel images of operating systems corresponding to the other processing cores that need to run the operating systems into memory segments of the other processing cores.

Specifically, in the implementation manner 2, the boot loader 1111 stores, according to the running information 123a, the kernel image of the operating system that at least one processing core of the processor needs to run into the memory segment of the processor. For example, the boot loader 1111 stores, according to the running information 123a, the kernel image of the operating system 1 that the start-time primary core 111 needs to run into the memory segment 121 allocated to the start-time primary core 111; then, the start-time primary core 111 runs the kernel image of the operating system 1 in the memory segment 121; and subsequently, the start-time primary core 111 stores, according to the running information 123a and by using the running operating system 1, the kernel image of the operating system 2 that the start-time secondary core 112 needs to run into the memory segment 122 of the start-time secondary core 112, so as to spread, in respective memory segments, the kernel images of the operating systems that the processing cores need to run. It should be noted that, this embodiment describes an example that the start-time primary core 111 acts as the processing core that firstly runs an operating system, but persons skilled in the art should understand that, the processing core that firstly starts and runs the operating system is not limited to the start-time primary core 111, and that any processing core of the processor 11 may be determined as the processing core that firstly starts and runs the operating system in, for example, a manner designated in advance.

In the system for supporting resource isolation in a multi-core architecture provided by this embodiment of the present invention, the kernel images of the operating systems that the processing cores need to run are spread in respective memory segments, so that the memory segments of different processing cores store the kernel images of the operating systems that the respective processing cores need to run, and resources on the memory segments are isolated from each other.

On the basis of the foregoing embodiment, the mapping relationship between each processing core and each operating system recorded in the running information at least includes the following two relationships.

Mapping relationship 1: a processing core group that includes of at least two processing cores runs a kernel image of a same operating system. Optionally, all processing cores that constitute the processing core group share a same memory segment.

Specifically, the processing core group that includes at least two processing cores runs a kernel image of a same operating system. All processing cores that constitute the processing core group may share a same memory segment. The number of the processing core groups may be more than one, and operating systems separately run by each processing core group are independent of each other. Memory segments that are independent of each other are allocated to different operating systems, so that a failure in a single operating system does not affect other processing core groups or operating systems that run on other processing core groups, and thereby it is achieved that a failure domain of the multi-core processor remains in a single hard disk.

Mapping relationship 2: the processing cores run kernel images of mutually different operating systems.

Optionally, according to the running information, there may be a situation that a processing core group and an independent single processing core coexist in the processor 11.

On the basis of the foregoing embodiment, the operating systems that are independent of each other run on the processing core group or independent single processing cores, thereby achieving inter-core operating system isolation. Considering that I/O resources and coprocessors of the multi-core processor are globally shared, after the processing cores are started, it is required to select one processing core from the processing cores to perform unified arbitration control over the I/O resources. Further, the processing cores of the processor elect and determine a run-time primary core from the processing cores according to a preset election algorithm. The run-time primary core is used to perform arbitration control over the I/O resources.

Optionally, a run-time secondary core puts data that requires an I/O operation in the shared memory segment, and notifies the run-time primary core of a memory address related to the I/O operation, so that the run-time primary core invokes its own local physical drive to perform the I/O operation on an external device.

Optionally, the run-time secondary core invokes its own local physical drive, to perform the I/O operation on an external device.

Specific implementation of the foregoing system for supporting resource isolation in a multi-core architecture is described in detail by using a specific embodiment.

Second Embodiment

Figure 3:
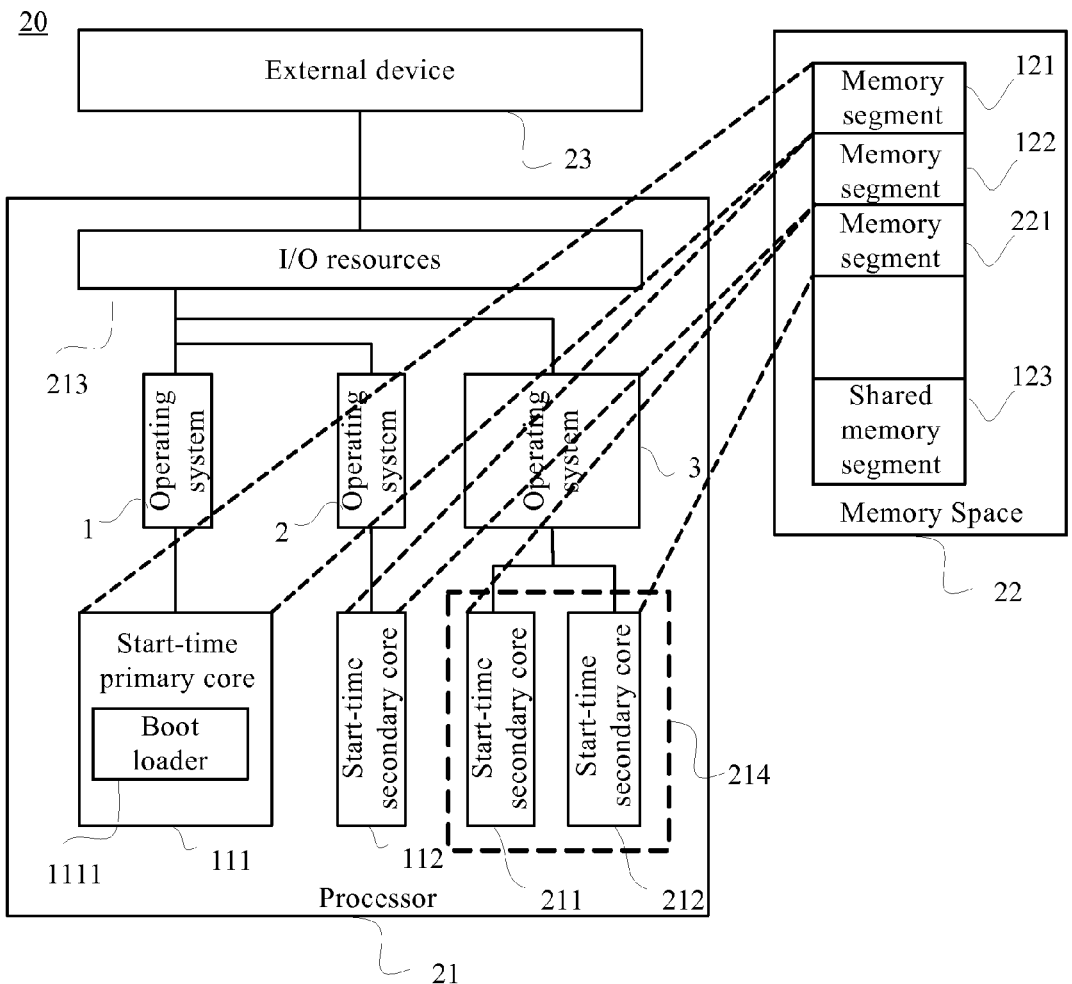
FIG. 3 is a schematic structural diagram of a system for supporting resource isolation in a multi-core architecture according to a second embodiment of the present invention.

FIG. 3 is a schematic structural diagram of a system for supporting resource isolation in a multi-core architecture according to a second embodiment of the present invention. This embodiment is implemented based on the foregoing embodiment. As shown in FIG. 3, a system 20 for supporting resource isolation in a multi-core architecture in this embodiment includes a processor 21 and memory space 22. The processor 21 includes a start-time primary core 111, a start-time secondary core 112, a start-time secondary core 211, and a start-time secondary core 212. A boot loader 1111 is disposed inside the start-time primary core 111. In addition, the start-time primary core 111 and the start-time secondary core 112 run an operating system 1 and an operating system 2 respectively. The start-time secondary core 211 and the start-time secondary core 212 constitute a processing core group 214. The processing core group 214 runs a same operating system 3. The start-time primary core 111 corresponds to a memory segment 121, the start-time secondary core 112 corresponds to a memory segment 122, and the processing core group 214 corresponds to a memory segment 221, and all these information is recorded in running information.

Specifically, the running information records, for example, the following information: (1) the start-time primary core 111 running the operating system 1, and a size and a start address of the memory segment 121 allocated to the start-time primary core 111; (2) the start-time secondary core 112 running the operating system 2, and a size and a start address of the memory segment 122 allocated to the start-time secondary core 112; and (3) the processing core group 214 running the operating system 3, and a size and a start address of the memory segment 221 allocated to the processing core group 214. In the memory 22, memory segments are isolated among the memory segment 121, the memory segment 122, the memory segment 221, and the shared memory segment 123.

After the system is started, each processing core is in a spin state, where the spin state refers to that the processing cores keep idling and wait to be waked by an external event. After the boot loader 1111 completes device initialization, by using the boot loader 1111, the processor 21 separately stores, according to a mapping relationship between each processing core and each operating system, and the sizes and the start addresses of the memory segments that are recorded in the running information, kernel images of the operating systems that the processing cores need to run into the memory segments of the processor by using a boot loader mode or a download mode, and separately writes the run-time entry addresses of the processing cores into the shared memory segment 123.

In this embodiment, the processing core that firstly starts and runs an operating system is preset to be the start-time primary core 111, but the present invention is not limited thereto, and the processing core that firstly starts and runs the operating system may also be preset to be another processing core of the processor 11.

The start-time primary core 111 reads its own run-time entry address pointer, and checks whether there is a valid physical address, and if yes, jumps to the run-time entry address of the start-time primary core 111 to which the run-time entry address pointer points, and runs a kernel image of the operating system 1, so as to run the operating system 1. The start-time primary core 111 wakes processing cores to be started by using an inter-core communication mechanism. The processing cores to be started separately read respective run-time entry address pointers, and check whether there are valid physical addresses, and if yes, jump to run-time entry addresses to which respective run-time entry address pointers point, and run kernel images of corresponding operating systems, so as to run the corresponding operating systems. In the execution process, the processing cores jump to running information addresses to read the running information, and learn the operating systems that the respective processing cores need to run, and the sizes and the start addresses of the allocated memory segments. Therefore, the processing cores can only perform an operation on the shared memory segment 123 and respective memory segments. Therefore, in the system 20 for supporting resource isolation in a multi-core architecture in this embodiment, the operating systems that are independent of each other run on different processing cores or the processing core group of the processor. Furthermore, only when the system is started, the boot loader 1111 that runs on the start-time primary core 111 stores the kernel images of the operating systems that each processing core or the processing core group needs to run, into the memory segments of the processing cores or the processing core group. Then, each processing core may be independently restarted, hibernated, or shut down, without affecting normal running of other processing cores. Particularly, when a single processing core or its operating system fails, other processing cores or the operating systems run on other processing cores are not be affected, thereby achieving inter-core operating system isolation.

An optional implementation scenario is that: when being restarted independently, a processing core only needs to be reset, reads a corresponding run-time entry address pointer to obtain the corresponding run-time entry address, and runs a kernel image of an operating system stored in a memory segment of the processing core without depending on the operating systems of the other processing cores.

Another optional implementation scenario is that: in the system running process, for a certain processing core, the other processing cores may modify running information according to system requirements, the processing core is reset after learning that the running information is modified; when being restarted, the processing core learns new running information by reading the new running information in the running information address, and runs a re-designated operating system by reading a run-time entry address in a run-time entry address pointer. For example, at a moment after a system is started, a processing core a of a multi-core processor has already occupied a memory segment, and runs an operating system A on the processing core a, and a processing core b is in a spin state; a processing core c may modify the running information according to a system running state, and the modified running information re-designates: that the processing core a and the processing core b constitute a processing core group T, and run a same operating system B on the processing core group T, a size of the memory segment allocated to the processing core group T, and a start address of the memory segment. After the processing core a learns that the running information is changed, optionally, the processing core a firstly unloads the operating system A that run on the processing core a, and releases the occupied memory segment, and the processing core a is restarted. The processing core group T (the processing core a and the processing core b) runs the operating system B according to the modified running information, and occupies a new memory segment.

After the processing cores of the processor 21 are started, the operating systems that are independent of each other run on the processing cores or the processing core group, thereby achieving memory segment isolation and inter-core operating system isolation. Considering that I/O resources and coprocessors of the multi-core processor are globally shared, after the processing cores are started, it is required to select one run-time primary core from the processing cores of the processor 21. The run-time primary core refers to the processing core that can perform centralized control and arbitration on the processing cores when the processing cores of the processor 21 are started. The run-time primary core is responsible for unified arbitration control over the I/O resources. Specifically, the run-time primary core is elected and determined by the processing cores of the processor 21 from the processing cores according to a preset election algorithm. As shown in FIG. 3, it is assumed that all the start-time primary core 111, the start-time secondary core 112, the start-time secondary core 211, and the start-time secondary core 212 of the processor 21 are in a running state, and the four processing cores in the running state constitute a cluster. In this cluster, the four processing cores run an election algorithm, for example, a PAXOS algorithm, by using inter-core communication, to elect and determine a run-time primary core. For example, an election result is that: the start-time primary core 111 is elected as the run-time primary core, and the other processing cores are run-time secondary cores. It should be noted that, the run-time primary core elected by the cluster by using multi-core negotiation is not limited to the start-time primary core 111, and may be any processing core. This embodiment merely shows an example that the start-time primary core acts as the elected run-time primary core, but the present invention is not limited thereto. When the elected run-time primary core fails, the cluster of the processing cores re-elects a new run-time primary core. Uniqueness of the run-time primary core is ensured by the election algorithm, for example, the PAXOS algorithm.

The run-time primary core is responsible for unified arbitration control over the I/O resources, and usage of all the I/O resources and coprocessor resources needs to be authorized by the run-time primary core.

When a run-time secondary core needs to access an external device 23, the run-time secondary core sends a resource usage request to the run-time primary core. According to the resource usage request, the run-time primary core sends a resource request response to the run-time secondary core after exclusiveness usage resource arbitration based on a system resource usage condition and a resource allocation policy. After receiving the resource request response, the run-time secondary core obtains usage authorization of the I/O resources, and starts to perform an I/O operation on the external device 23.

When the system resource usage condition and the resource allocation policy allow, the run-time primary core may invoke its own local physical drive to perform the I/O operation on the external device. Each run-time secondary core may use the I/O resources to access the external device 23 in at least the following two manners:

Manner 1: a run-time secondary core puts data that requires the I/O operation in the shared memory segment, and notifies the run-time primary core of a memory address related to the I/O operation, so that the run-time primary core invokes its own local physical drive to perform the I/O operation on the external device.

Manner 2: the run-time secondary core invokes its own local physical drive to perform the I/O operation on the external device.

FIG. 4a is a schematic diagram of implementation that a run-time secondary core of the system for supporting resource isolation in a multi-core architecture according to the second embodiment of the present invention accesses an external device; and FIG. 4b is a schematic diagram of another implementation that a run-time secondary core of the system for supporting resource isolation in a multi-core architecture according to the second embodiment of the present invention accesses an external device.

As shown in FIG. 4a, a run-time secondary core 402 puts data that requires an I/O operation in the shared memory segment, and notifies a run-time primary core 401 of a memory address related to the I/O operation, so that the run-time primary core 401 invokes its own local physical drive 4011, to perform the I/O operation on the external device 23. That the run-time secondary core 402 performs the I/O operation on the external device 23 is implemented by the run-time primary core 401 as an agent. The run-time secondary core 402 may put the data that requires this I/O operation to the shared memory segment in a manner of sharing the memory, and notify the run-time primary core 401 of the memory address related to the I/O operation. The run-time primary core 401 receives notification information sent by the run-time secondary core 402, invokes the local physical drive 4011, and sends the data to the external device 23 by means of the I/O resources, to access the external device 23. For example, the run-time primary core 401 performs the I/O operation on the external device 23, and releases the I/O resources and related resources of the external device 23 after the access is completed.

As shown in FIG. 4b, the run-time secondary core 402 invokes its own local physical drive 4021, and performs the I/O operation on the external device 23. When the run-time secondary core 402 needs to access the external device 23, the run-time primary core 401 approves the run-time secondary core 402 to use the I/O resources in a manner of control and arbitration. The run-time secondary core 402 accesses the allocated external device in a straight-through manner according to the resource request response sent by the run-time primary core 401, which includes performing an I/O straight-through operation on the external device 23, and directly performing the I/O resource operation by invoking the local physical drive 4021. That is, each processing core performs the I/O operation on the external device 23 in a straight-through manner, and releases the control over the I/O resources to the run-time primary core 401 after the operation is completed, namely, notifies the run-time primary core 401 that the I/O operation on the external device 23 is completed. The run-time primary core 401 releases the I/O resources and related resource of the external device 23 according to the notification, so as to release the resources to the other processing cores.

Optionally, state synchronization information is maintained between the run-time primary core and the run-time secondary core. When the run-time primary core finds that a certain processing core cannot be contacted, and if at this time the run-time primary core has already allocated an external device resource to the processing core that cannot be contacted, the run-time primary core takes back the external device resource. In the system for supporting resource isolation in a multi-core architecture provided by the foregoing embodiment of the present invention, the run-time primary core is responsible for unified arbitration control over the I/O resources, so that each processing core uses the I/O resources to access the external device. It should be noted that, the system for supporting resource isolation in a multi-core architecture provided by the foregoing embodiment of the present invention is also used for each processing core to access a common function part. The common function part may at least include coprocessor resources. Refer to the description of the foregoing embodiment for the detailed implementation manner of arbitration application of shared coprocessor resources, and details are not described herein again.

In the system for supporting resource isolation in a multi-core architecture provided by the embodiment of the present invention, the run-time primary core is elected from the processing cores to be responsible for unified arbitration control over I/O resources, thereby achieving I/O resource isolation. In a situation in which the operating systems that run on each processing core or the processing core group run independently of each other, unified I/O capability and coprocessor scheduling control in the multi-core processor are achieved, thereby ensuring that a failure domain of a multi-core processor remains in a single hard disk.

Third Embodiment

FIG. 5 is a flowchart of a method for supporting resource isolation in a multi-core architecture according to a third embodiment of the present invention. The method of this embodiment is applicable to a system for supporting resource isolation in a multi-core architecture, where the system includes a processor and memory space. The processor includes multiple processing cores, and the multiple processing cores include a start-time primary core and at least one start-time secondary core. The memory space includes a shared memory segment and memory segments of the processing cores. Running information and run-time entry addresses of the processing cores are stored in the shared memory segment. The running information includes a mapping relationship between each processing core and each operating system, and sizes and start addresses of the memory segments. The run-time entry addresses of the processing cores are used to indicate, in respective memory segments, storage addresses of kernel images of operating systems that the processing cores need to run. As shown in FIG. 5, the method in this embodiment includes the following steps.

501: A processor separately stores the kernel images of the operating systems that the processing cores need to run into the memory segments of the processing cores, and separately writes the run-time entry addresses of the processing cores into the shared memory segment.

502: Processing cores to be started separately obtain respective run-time entry addresses, and run the kernel images of the operating systems stored in respective memory segments.

Optionally, the processing cores of the processor elect and determine a run-time primary core from the processing cores according to a preset election algorithm, where the run-time primary core is used to perform arbitration control over input/output I/O resources.

Optionally, a run-time secondary core puts data that requires an I/O operation in the shared memory segment, and notifies the run-time primary core of a memory address related to the I/O operation, so that the run-time primary core invokes its own local physical drive to perform the I/O operation on an external device.

Optionally, the run-time secondary core invokes its own local physical drive, to perform the I/O operation on an external device.

Optionally, a boot loader is disposed inside the start-time primary core; and that the processor separately stores the kernel images of the operating systems that the processing cores need to run into the memory segments of the processing cores includes: the boot loader separately stores, according to the running information, the kernel images of the operating systems that the processing cores need to run into the memory segments of the processing cores.

Optionally, a boot loader is disposed inside the start-time primary core; and that the processor separately stores the kernel images of the operating systems that the processing cores need to run into the memory segments of the processing cores includes: the boot loader stores, according to the running information, the kernel image of the operating system that needs to be run into the memory segment allocated to at least one processing core of the processor, and runs the kernel image of the operating system; and the processing core that runs the operating system separately stores, according to the running information, kernel images of operating systems corresponding to the other processing cores that need to run the operating systems, of the processor into memory segments of the other processing cores.

Optionally, a processing core group that includes at least two processing cores runs a kernel image of a same operating system, and furthermore, all the processing cores that constitute the processing core group share a same memory segment; or, the processing cores run kernel images of mutually different operating systems.

In the method for supporting resource isolation in a multi-core architecture provided by the embodiment of the present invention, manners of inter-core operating system isolation, memory segment isolation, and I/O resource isolation are adopted, so that the operating systems that are run on different processing cores of the multi-core processor can run independently without affecting each other. Therefore, the advantages high integration level and low comprehensive costs of the multi-core processor are fully used, it is achieved that a failure domain of the multi-core processor remains in a single hard disk, and the multi-core processor has high reliability.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A multi-core system for supporting resource isolation, comprising:
   a processor having multiple processing cores, comprising a primary processing core and one or more secondary processing cores, wherein the primary processing core comprises a boot loader and each of the one or more secondary processing cores comprises no boot loader; and
   a memory including a shared memory segment and multiple private memory segments, wherein each of the multiple private memory segments corresponds to one of the multiple processing cores,
   wherein the shared memory segment stores running information that includes a mapping relationship between the multiple processing cores and a plurality of corresponding operating systems each of which is run by one of the multiple processing cores,
   wherein the boot loader is configured to (a) store kernel images of the plurality of operating systems into the multiple private memory segments according to the running information, and (b) write multiple run-time entry addresses into the shared memory segment, wherein each of the multiple run-time entry addresses includes an address of each of the kernel images; and
   wherein each of the multiple processing cores is configured to obtain a corresponding run-time entry address from the shared memory segment and run a corresponding kernel image of one of the plurality of the corresponding operating systems according to the obtained corresponding run-time entry address.

2. The multi-core system for supporting resource isolation according to claim 1, wherein the primary processing core is identified according to a preset election algorithm, and wherein the primary processing core is further configured to perform arbitration control over input/output resources.

3. The multi-core system for supporting resource isolation according to claim 2, wherein each of the one or more secondary processing cores is further configured to put data that requires an I/O operation in the shared memory segment, and notify the primary processing core of a memory address related to the I/O operation, and wherein the primary processing core is further configured to invoke local physical drive to perform the I/O operation on an external device.

4. The multi-core system for supporting resource isolation according to claim 2, wherein each of the one or more secondary processing cores is further configured to invoke a local physical drive to perform an I/O operation on an external device.

5. The multi-core system for supporting resource isolation according to claim 1, wherein the plurality of the corresponding operating systems are of mutually different operating systems.

6. A method for supporting resource isolation in a multi-core system, comprising:
  storing, by a boot loader each kernel image of a plurality of corresponding operating systems into a corresponding private memory segment of the multi-core system according to running information wherein the multi-core system includes a processor having multiple processing cores, wherein the multiple processing cores include a primary processing core and one or more secondary processing cores, wherein the primary processing core comprises the boot loader and each of the one or more secondary cores comprises no boot loader, and wherein the multi-core system further includes a shared memory segment and multiple private memory segments, wherein each of the multiple private memory segments corresponds to one of the multiple processing cores, wherein the shared memory segment stores the running information that includes a mapping relationship between the multiple processing cores and the plurality of the corresponding operating systems, each of which is run by one of the multiple processing cores;
  writing, by the boot loader, multiple run-time entry addresses into the shared memory segment, wherein each of the multiple run-time entry addresses includes an address of the kernel image stored in the corresponding private memory segment; and
  obtaining, by each of the multiple processing cores a corresponding run-time entry address from the shared memory segment; and
  running, by each of the multiple processing cores, a corresponding kernel image of one of the plurality of the corresponding operating systems according to the obtained corresponding run-time entry address.

7. The method for supporting resource isolation in the multi-core system according to claim 6,
  wherein the primary processing core is identified according to a preset election algorithm.

8. The method for supporting resource isolation in the multi-core system according to claim 7, further comprising:
  performing, by the primary processing core, arbitration control over input/output resources.

9. The method for supporting resource isolation in a multi-core system according to claim 7, further comprising:
  storing, by a secondary processing core of the one or more secondary processing cores data that requires an I/O operation in the shared memory segment;
  notifying, by the secondary processing core of the one or more secondary processing cores, the primary processing core of a memory address related to the I/O operation; and
  invoking, by the primary processing core, a local physical drive to perform the I/O operation on an external device.

10. The method for supporting resource isolation in the multi-core system according to claim 7, further comprising:
  invoking, by a secondary processing core of the one or more secondary processing cores, a local physical drive to perform an I/O operation on an external device.

11. The method for supporting resource isolation in a multi-core system according to claim 6, wherein the plurality of the corresponding operating systems are of mutually different operating systems.

12. A non-transitory computer readable medium for supporting resource isolation in a multi-core system comprising processor-executable instructions which when executed by a processor causes the processor to implement the following:
  storing, each kernel image of a plurality of corresponding operating systems into a corresponding private memory segment of the multi-core system according to running information, wherein the multi-core system includes the processor having multiple processing cores, wherein the multiple processing cores include a primary processing core and one or more secondary processing cores, wherein the primary processing core comprises a boot loader and each of the one or more secondary cores comprises no boot loader, and wherein the multi-core system further includes a shared memory segment and multiple private memory segments, wherein each of the multiple private memory segments corresponds to one of the multiple processing cores, wherein the shared memory segment stores the running information that includes a mapping relationship between the multiple processing cores and the plurality of the corresponding operating systems, each of which is run by one of the multiple processing cores;
  writing, multiple run-time entry addresses into the shared memory segment, wherein each of the multiple run-time entry addresses includes an address of the kernel image stored in the corresponding private memory segment; and
  obtaining, a corresponding run-time entry address from the shared memory segment; and
  running, by each of the multiple processing cores, a corresponding kernel image of one of the plurality of the corresponding operating systems according to the obtained corresponding run-time entry address.

13. The non-transitory computer readable medium for supporting resource isolation in the multi-core system according to claim 12, wherein the primary processing core is identified according to a preset election algorithm.

14. The non-transitory computer readable medium for supporting resource isolation in the multi-core system according to claim 13, wherein the instructions further causes the processor to implement:
  performing, arbitration control over input/output resources.

15. The non-transitory computer readable medium for supporting resource isolation in a multi-core system according to claim 13, wherein the instructions further causes the processor to implement:
  storing, data that requires an I/O operation in the shared memory segment;
  notifying, the primary processing core of a memory address related to the I/O operation; and
  invoking, a local physical drive to perform the I/O operation on an external device.

16. The non-transitory computer readable medium for supporting resource isolation in the multi-core system according to claim 13, wherein the instructions further causes the processor to implement:
  invoking, a local physical drive to perform an I/O operation on an external device.

17. The non-transitory computer readable medium for supporting resource isolation in a multi-core system according to claim 12, wherein the plurality of the corresponding operating systems are of mutually different operating systems.

* * * * *